United States Patent
Li et al.

(10) Patent No.: US 8,239,195 B2
(45) Date of Patent: Aug. 7, 2012

(54) ADAPTING A COMPRESSED MODEL FOR USE IN SPEECH RECOGNITION

(75) Inventors: Jinyu Li, Redmond, WA (US); Li Deng, Redmond, WA (US); Dong Yu, Kirkland, WA (US); Jian Wu, Sammamish, WA (US); Yifan Gong, Sammamish, WA (US); Alejandro Acero, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 926 days.

(21) Appl. No.: 12/235,748

(22) Filed: Sep. 23, 2008

(65) Prior Publication Data

US 2010/0076757 A1 Mar. 25, 2010

(51) Int. Cl.
*G10L 15/20* (2006.01)
(52) U.S. Cl. .......... 704/233; 704/226; 704/256
(58) Field of Classification Search .......... 704/226, 704/233, 256–256.8
See application file for complete search history.

(56) References Cited

U.S. PATENT DOCUMENTS

| | | | |
|---|---|---|---|
| 5,627,939 A | | 5/1997 | Huang et al. |
| 5,727,124 A | * | 3/1998 | Lee et al. .......... 704/233 |
| 5,848,384 A | * | 12/1998 | Hollier et al. .......... 704/231 |
| 6,006,186 A | | 12/1999 | Chen et al. |
| 6,768,979 B1 | * | 7/2004 | Menendez-Pidal et al. .. 704/226 |
| 6,907,398 B2 | | 6/2005 | Hoege |
| 7,219,057 B2 | | 5/2007 | Yang |
| 7,236,930 B2 | * | 6/2007 | Bernard et al. .......... 704/233 |
| 2003/0115055 A1 | * | 6/2003 | Gong .......... 704/233 |
| 2004/0181408 A1 | | 9/2004 | Acero et al. |
| 2004/0230424 A1 | | 11/2004 | Gunawardana |
| 2007/0033027 A1 | * | 2/2007 | Yao .......... 704/233 |
| 2007/0033028 A1 | * | 2/2007 | Yao .......... 704/233 |
| 2007/0033034 A1 | | 2/2007 | Yao |
| 2007/0088552 A1 | | 4/2007 | Olsen |
| 2008/0300875 A1 | * | 12/2008 | Yao et al. .......... 704/236 |

OTHER PUBLICATIONS

Li, et al., "High-Performance HMM Adaptation with Joint Compensation of Additive and Convolutive Distortions via Vector Taylor Series", Retrieved at <<http://research.microsoft.com/~dongyu/papers/jac-asru2007.pdf>>, ASRU 2007, pp. 65-70.
Varga, et al., "ASR in Mobile Phones—An Industrial Approach", Retrieved at <<http://ieeexplore.ieee.org/iel5/89/26392/01175528.pdf?tp=&isnumber=&arnumber=1175528>>, IEEE Transactions on Speech and Audio Processing, vol. 10, No. 8, Nov. 2002, pp. 562-569.
Ortega, et al., "Towards Efficient and Scalable Speech Compression Schemes for Robust Speech Recognition Applications", Retrieved at <<http://ieeexplore.ieee.org/iel5/6974/18800/00869589.pdf?arnumber=869589>>, pp. 249-252.
Astrov, et al., "High Performance Speaker and Vocabulary Independent ASR Technology for Mobile Phones", Retrieved at <<http://ieeexplore.ieee.org/iel5/8535/27072/01202349.pdf?tp=&arnumber=1202349&isnumber=27072>>, pp. 281-284.

(Continued)

*Primary Examiner* — Abul Azad

(57) ABSTRACT

A speech recognition system includes a receiver component that receives a distorted speech utterance. The speech recognition also includes an adaptor component that selectively adapts parameters of a compressed model used to recognize at least a portion of the distorted speech utterance, wherein the adaptor component selectively adapts the parameters of the compressed model based at least in part upon the received distorted speech utterance.

20 Claims, 13 Drawing Sheets

OTHER PUBLICATIONS

Bocchieri, et al., "Subspace Distribution Clustering Hidden Markov Model", Retrieved at <<http://ieeexplore.ieee.org/iel5/89/19597/00906000.pdf?tp=&isnumber=19597&arnumber=906000>>, IEEE Transactions on Speech and Audio Processing, vol. 9, No. 3, Mar. 2001, pp. 264-275.

Gauvain, et al., "Maximum a Posteriori Estimation for Multivariate Gaussian Mixture Observations of Markov Chains", Retrieved at <<http://ieeexplore.ieee.org/iel4/89/6926/00279278.pdf>>, IEEE Transactions on Speech and Audio Processing, vol. 2, No. 2, Apr. 1994, pp. 291-298.

Cui, et al., "Noise Robust Speech Recognition Using Feature Compensation Based on Polynomial Regression of Utterance SNR", Retrieved at <<http://ieeexplore.ieee.org/iel5/89/32511/01518916.pdf?arnumber=1518916>>, IEEE Transactions on Speech and Audio Processing, vol. 13, No. 6, Nov. 2005, pp. 1161-1172.

Gong, Yifan, "A Method of Joint Compensation of Additive and Convolutive Distortions for Speaker-Independent Speech Recognition", Retrieved at <<http://ieeexplore.ieee.org/iel5/89/32132/01495479.pdf>>, IEEE Transactions on Speech and Audio Processing, vol. 13, No. 5, Sep. 2005, pp. 975-983.

Kim, et al., "Speech Recognition in Noisy Environments Using First Order Vector Taylor Series", Retrieved at <<http://citeseer.ist.psu.edu/cache/papers/cs/3377/http:zSzzSzwww.dcs.shef.ac.ukzSz~ljupcozSzpaperszSzSC24-Kim-891.pdf/kim98speech.pdf>>, Speech Communication 24, 1998, pp. 39-49.

Moreno, Pedro J., "Speech Recognition in Noisy Environments", Retrieved at <<http://www.cs.cmu.edu/~robust/Thesis/pjm_thesis.pdf>>, Department of Electrical and Computer Engineering, Carnegie Mellon University, Pittsburgh, Pennsylvania, 15213, Apr. 22, 1996, pp. 1-130.

Pearce, et al., "The Aurora Experimental Framework for the Performance Evaluation of Speech Recognition Systems under Noisy Conditions", Retrieved at <<http://dnt.kr.hs-niederrhein.de/papers/icslp2000_final_footer.pdf>>, ICSLP 2000 (6th International Conference on Spoken Language Processing), Beijing, China, Oct. 16-20, 2000, pp. 4.

* cited by examiner

ADAPTING A COMPRESSED MODEL FOR USE IN SPEECH RECOGNITION

BACKGROUND

Speech recognition has been the subject of a significant amount of research and commercial development. For example, speech recognition systems have been incorporated into mobile telephones, desktop computers, automobiles, and the like in order to provide a particular response to speech input provided by a user. For instance, in a mobile telephone equipped with speech recognition technology, a user can speak a name of a contact listed in the mobile telephone and the mobile telephone can initiate a call to the contact. Furthermore, many companies are currently using speech recognition technology to aid customers in connection with identifying employees of a company, identifying problems with a product or service, etc.

As noted above, speech recognition systems have been incorporated into mobile devices, such as mobile telephones. Robust speech recognition systems, however, typically employ models that require a relatively large amount of storage and/or processing resources—resources that are constrained due to the size of mobile devices. As a result, speech recognition systems in mobile devices have been associated with reduced functionality (in comparison to robust speech recognition systems) and/or relatively poor performance, particularly in noisy environments.

SUMMARY

The following is a brief summary of subject matter that is described in greater detail herein. This summary is not intended to be limiting as to the scope of the claims.

Technologies pertaining to speech recognition in general, and technologies pertaining to adapting parameters of compressed models used in speech recognition systems in mobile devices in particular, are described herein. In an example, a speech recognition system can include a plurality of compressed models, wherein at least one of the compressed models can be a Hidden Markov Model.

In an example, a speech utterance can be received at a mobile device (or other device with memory and/or processing constraints) through use of one or more microphones. The speech utterance can have various distortions, including additive distortions and convolutive distortions. At least one of the plurality of compressed models in the speech recognition system can be adapted based at least in part upon the distorted speech utterance.

In an example, coarse estimates of various parameters pertaining to uttered speech can be ascertained through analysis of a received, distorted speech utterance. For instance, an additive distortion mean vector can be estimated by analyzing samples of a first plurality of frames (speech free) of the received distorted speech utterance. Such additive distortion mean vector, for example, can be used to initially adapt at least a first subset of compressed models in the plurality of compressed models or parameters thereof. The received distorted speech utterance can then be decoded through use of the plurality of compressed models, and thereafter at least one of the various parameters estimated above can be more accurately estimated (re-estimated) based at least in part upon results of decoding the speech utterance. A second subset of compressed models in the plurality of compressed models can then be adapted based at least in part upon the at least one re-estimated parameter. In another example, each of the plurality of compressed models can be adapted based at least in part upon the at least one re-estimated parameter.

Other aspects will be appreciated upon reading and understanding the attached figures and description.

DETAILED DESCRIPTION

Figure 1:
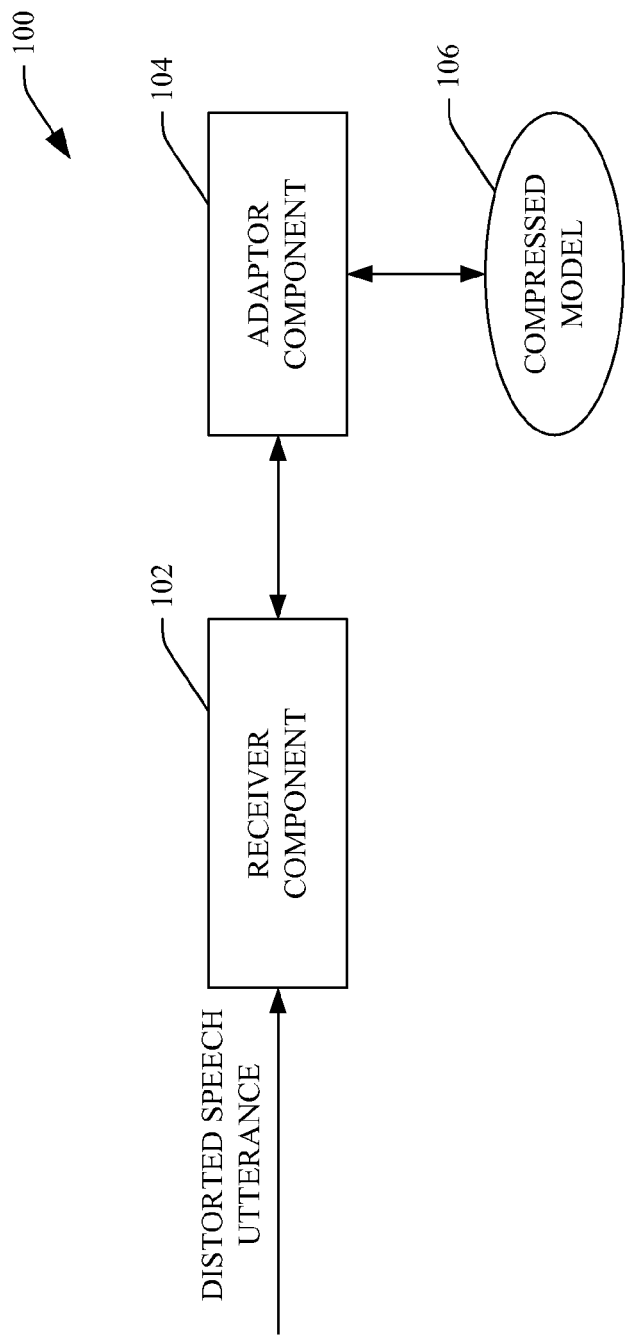
FIG. 1 is a functional block diagram of an example system that facilitates adapting parameters of a compressed model in a speech recognition system.

Various technologies pertaining to speech recognition will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example speech recognition system 100 that facilitates adapting parameters of a compressed model for utilization in connection with speech recognition is illustrated. In an example, the system 100 can be well-suited for use in a mobile device, such as a mobile telephone, a personal digital assistant, a smart phone, or other suitable mobile device. It is to be understood, however, that the system 100 can also be well-suited for use in conventional computing devices, such as desktop computers, computers in automobiles, or other devices where hands-free communication may be desirable.

The system 100 includes a receiver component 102 that receives a distorted speech utterance from an individual. Thus, the receiver component 102 can be in communication with a microphone or series of microphones (not shown). The distorted speech utterance can include additive and convolutive distortions. In an example, an additive distortion can be or include background noise, such as a fan running in the background, road noise from an automobile, etc. A convolutive distortion can be channel noise, such as a change in position of a microphone, an alteration from a hand-held to a hands-free microphone, or other suitable channel noise. As noted above, the distorted speech utterance can include both additive and convolutive distortions.

The system 100 further includes an adaptor component 104 that can adapt parameters of a compressed model 106 that is used in connection with recognizing at least a portion of the distorted speech utterance. For instance, the adaptor component 104 can adapt parameters of the compressed model 106 based at least in part upon the distorted speech utterance received by the receiver component 102. Pursuant to an example, the adaptor component 104 can be configured to jointly compensate for additive and convolutive distortions in the received speech utterance when adapting the parameters of the compressed model 106.

In an example, and as will be described in greater detail below, the compressed model 106 can be a compressed Hidden Markov Model (HMM). The HMM can be trained using clean speech and/or speech that includes one or more distortions. Further, the Hidden Markov Model can be compressed using Subspace Coding (SSC). It is to be understood, however, that other compression techniques are also contemplated and are intended to fall under the scope of the hereto-appended claims. In yet another example, the adaptor component 104 can jointly take into consideration additive and convolutive distortion in connection with adapting parameters of the compressed model 106.

Furthermore, the adapter component 104 can utilize various techniques for adapting the compressed model 106 (and other compressed models) in connection with conserving storage (e.g., memory) and/or computing resources. For instance, as will be described herein, the adaptor component 104 can adapt parameters of the compressed model 106 only if the compressed model 106 is used in connection with recognizing at least a portion of the distorted speech utterance received by the receiver component 102.

Figure 2:
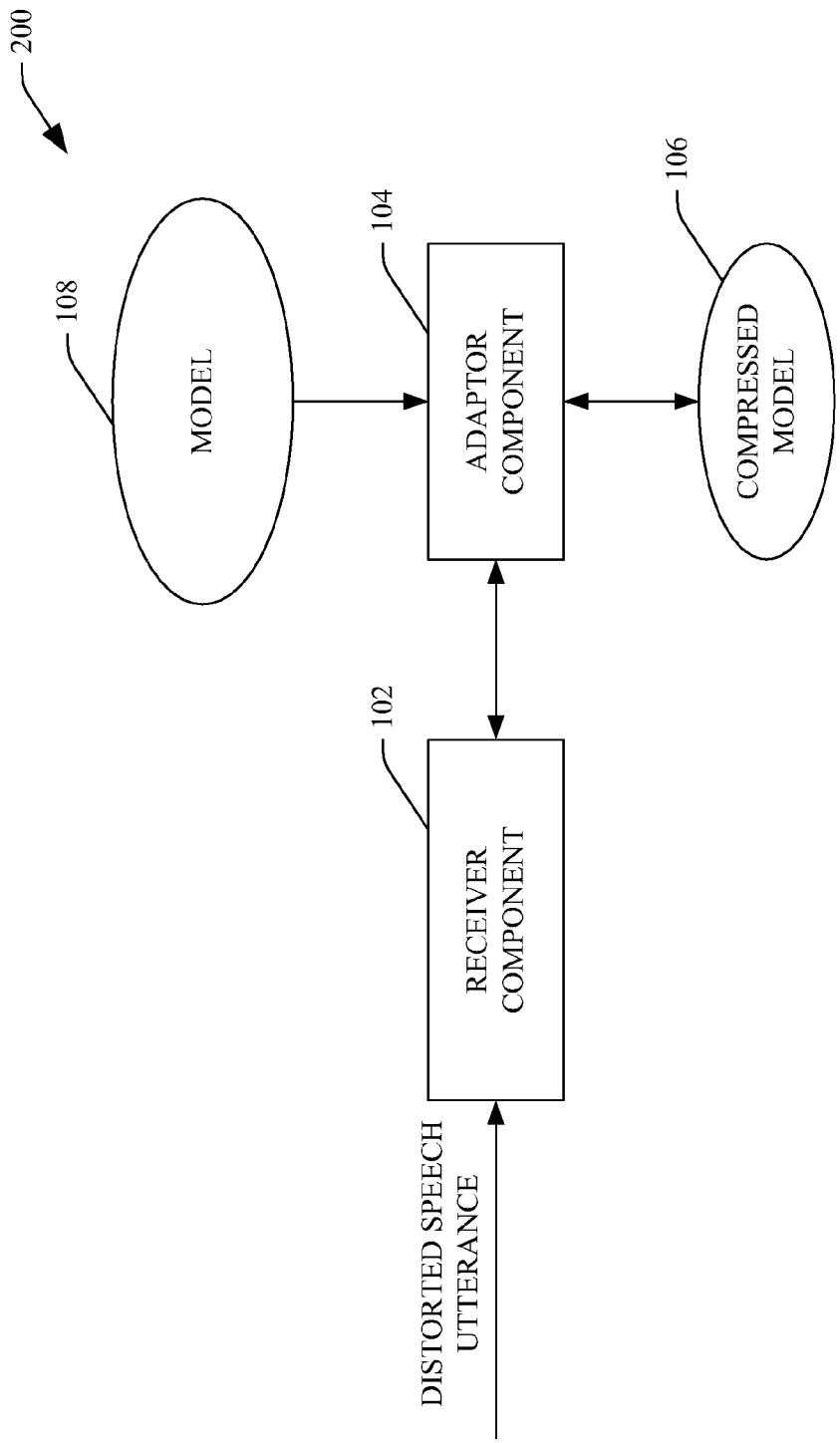
FIG. 2 is a functional block diagram of an example system that facilitates adapting parameters of a compressed model in a speech recognition system.

Referring now to FIG. 2, an example system 200 that facilitates adapting parameters of a model used to recognize speech utterances is illustrated. The system 200 includes the receiver component 102 and the adaptor component 104, which act as described above. The system 200 also includes a model 202 that can be used to model multiple distortions in the distorted speech utterance received by the receiver component 102. For instance, the model 202 can be a nonlinear model that is configured to model additive distortions and convolutive distortions in the received distorted speech utterance (without considering phase of distortions). In another example, the model 202 can be a nonlinear phase-sensitive model for modeling additive and convolutive distortions that takes into consideration phase of distortions.

For example, the distorted speech utterance can be referred to as y[m], and can be generated from a clean speech signal x[m] with noise (e.g., additive distortion) n[m] and the channel's impulse response (e.g., convolutive distortion) according to the following:

$$y[m]=x[m]*h[m]+n[m] \quad (1)$$

y, x, n, and h are the vector-valued distorted speech, clean speech, additive distortion, and convolutive distortion, respectively, all in the Mel-frequency cepstral coefficients (MFCC) domain.

Such a model can be used to ascertain an additive distortion mean vector $\mu_n$ and a convolutive mean distortion vector $\mu_h$ (e.g., in the Mel-frequency cepstral coefficients (MFCC) domain).

In another example, the model 202 can be a nonlinear phase-sensitive model of multiple distortions in uttered speech. As noted above, Equation (1) can be used to represent a distorted speech utterance. With discrete Fourier transformation (DFT), the following equivalent relations can be established in the frequency domain:

$$Y[k]=X[k]H[k]+N[k], \quad (2)$$

where k is a frequency-bin index in DFT given a fixed-length time window. The power spectrum of the distorted speech can then be the following:

$$|Y[k]|^2=|X[k]|^2|H[k]|^2+|N[k]|^2+2|X[k]||H[k]||N[k]|\cos\theta_k, \quad (3)$$

where $\theta_k$ denotes an (random) angle between the two complex variables N[k] and (X[k]H[k]).

By applying a set of Mel-scale filters (L in total) to the power spectrum in Equation (3), the l-th Mel filter-bank energies can be obtained for distorted speech, clean speech, additive distortion, and convolutive distortion, respectively, as follows:

$$|\tilde{Y}^{(l)}|^2 = \sum_k W_k^{(l)}|Y[k]|^2 \quad (4)$$

$$|\tilde{X}^{(l)}|^2 = \sum_k W_k^{(l)}|X[k]|^2 \quad (5)$$

$$|\tilde{N}^{(l)}|^2 = \sum_k W_k^{(l)}|N[k]|^2 \quad (6)$$

$$|\tilde{H}^{(l)}|^2 = \frac{\sum_k W_k^{(l)}|X[k]|^2|H[k]|^2}{|\tilde{X}^{(l)}|^2} \quad (7)$$

where the l-th filter can be characterized by the transfer function $W_k^{(l)} \geq 0 (\Sigma_k W_k^{(l)}=1)$.

The phase factor $\alpha^{(l)}$ of the l-th Mel filter bank can be:

$$\alpha^{(l)} = \frac{\sum_k W_k^{(l)}|X[k]||H[k]||N[k]|\cos\theta_k}{|\tilde{X}^{(l)}||\tilde{H}^{(l)}||\tilde{N}^{(l)}|} \quad (8)$$

Given the above, the following relation can be obtained in the Mel filter-bank domain for the l-th Mel filter bank output:

$$|\tilde{Y}^{(l)}|^2=|\tilde{X}^{(l)}|^2|\tilde{H}^{(l)}|^2+|\tilde{N}^{(l)}|^2+2\tilde{\alpha}^{(l)}\tilde{X}^{(l)}|\tilde{H}^{(l)}||\tilde{N}^{(l)}| \quad (9)$$

Further, a phase-factor vector for all the L Mel filter-banks can be defined as follows:

$$\alpha=[\alpha^{(1)},=^{(2)},\ldots =^{(l)},\ldots \alpha^{(L)}]^T \quad (10)$$

A logarithm can be taken of both sides of Equation (9) and non-square discrete cosine transform (DCT) matrix C can be multiplied to both sides of Equation (9) for all the L Mel filter banks, the following nonlinear, phase-sensitive distortion model can be obtained in the cepstral domain:

$$y=x+h+C\log(1+\exp(C^{-1}(n-x-h))+2\alpha\cdot\exp(C^{-1}(n-x-h)/2))=x+h+g_\alpha(x,h,n), \quad (11)$$

where $g^\alpha(x,h,n)=$ $$C\log(1+\exp(C^{-1}(n-x-h)+2\alpha\cdot\exp(C^{-1}(n-x-h)/2)) \quad (12)$$

and $C^{-1}$ is the (pseudo) inverse DCT matrix, and y, x, n, and h are the vector-valued distorted speech, clean speech, additive distortion, and convolutive distortion, respectively, all in the Mel-frequency cepstral coefficients (MFCC) domain. The • operation for two vectors can denote an element-wise product, and each exponentiation of a vector above may also be an element-wise operation. Again, such a model can be used to ascertain an additive distortion mean vector $\mu_n$ and a convolutive mean distortion vector $\mu_h$ (e.g., in the Mel-frequency cepstral coefficients (MFCC) domain).

The adaptor component 104 can adapt parameters of the compressed model 106 based at least in part upon the output of the model 202. For instance, the adaptor component 104 can adapt parameters of the compressed model 202 based at least in part upon the additive distortion mean vector $\mu_n$ and the convolutive mean distortion vector $\mu_h$.

Pursuant to an example, the adaptor component 104 can linearize output of the model 202, wherein the model is non-linear but does not contemplate phase. For instance, the adaptor component 104 can use a vector Taylor series (VTS) algorithm to output a first order approximation of x, n, and h. In an example, for a given additive distortion mean vector $\mu_n$ and convolutive mean distortion vector $\mu_h$, a matrix G(.) that depends on $\mu_x$ for a k-th Gaussian in a j-th state in the compressed model 106 can be defined as follows:

$$G(j,k) = C \cdot \text{diag}\left(\frac{1}{1+\exp(C^{-1}(\mu_n - \mu_{x,jk} - \mu_h))}\right) \cdot C^{-1}, \quad (13)$$

where C can be a non-square discrete cosine transform (DCT) matrix, $C^{-1}$ can be a (pseudo) inverse DCT matrix, and diag(.) can refer to a diagonal covariance matrix with its diagonal component value being equal to the value of the vector in the argument. Each division of a vector can also be an element-wise operation.

The adaptor component 104 can then adapt Gaussian mean vectors in the compressed model 106 for the k-th Gaussian in the j-th state for instance, using the following algorithm:

$$\mu_{y,jk} \approx \mu_{x,jk} + \mu_h + C \log(1+\exp(C^{-1}(\mu_n - \mu_{x,jk} - \mu_h))) \quad (14)$$

Further, the adaptor component 104 can adapt a covariance matrix in the compressed model 106 using the following algorithm:

$$\Sigma_{y,jk} \approx G(j,k)\Sigma_{x,jk}G((j,k)^T + (I-G(j,k))\Sigma_n(I-G(j,k))^T \quad (15)$$

where $\Sigma_{x,jk}$ is a covariance matrix for clean speech for the k-th Gaussian in the j-th state of the compressed model 106, and where $\Sigma_n$ is a covariance matrix for additive distortion.

For the delta and delta/delta portions of MFCC vectors, the adaptor component 104 can use the following algorithms to adapt the mean vector and covariance matrix:

$$\mu_{\Delta y,jk} \approx G(j,k)\mu_{\Delta x,jk} + (I-G(j,k))\mu_{\Delta n} \quad (16)$$

$$\mu_{\Delta\Delta y,jk} \approx G(j,k)\mu_{\Delta\Delta x,jk} + (I-G(j,k))\mu_{\Delta\Delta n} \quad (17)$$

$$\Sigma_{\Delta y,jk} \approx G(j,k)\Sigma_{\Delta x,jk}G(j,k)^T + (I-G(j,k))\Sigma_n(I-G(j,k))^T \quad (18)$$

$$\Sigma_{\Delta\Delta y,jk} \approx G(j,k)\Sigma_{\Delta\Delta x,jk}G(j,k)^T + (I-G(j,k))\Sigma_{\Delta\Delta n}(I-G(j,k))^T \quad (19)$$

As can be discerned, the example above (e.g., Equations (13)-(19)) describes the adaptor component 104 adapting a covariance matrix and delta and delta/delta portions of MFCC vectors without accounting for phase. It is to be understood, however, that the adaptor component 104 can consider phase when adapting such parameters.

For instance, as noted above, the adaptor component 104 can use a first-order VTS approximation with respect to x, n, and h. In an example, the adaptor component 104 can use an assumption that a phase-factor vector $\alpha$ is independent of x, n, and h, and the following can be obtained:

$$y \approx \mu_x + \mu_h + g(\mu_x, \mu_h, \mu_n) + G(x-\mu_x) + G(h-\mu_h) + (I-G)(n-\mu_n), \quad (20)$$

where $$\left.\frac{\partial y}{\partial x}\right|_{\mu_x,\mu_n,\mu_h} = \left.\frac{\partial y}{\partial h}\right|_{\mu_x,\mu_n,\mu_h} = G, \quad (21)$$

$$\frac{\partial y}{\partial n} = I - G, \quad (22)$$

$$G = 1 - C\text{diag}\left(\frac{\exp(C^{-1}(\mu_n - \mu_x - \mu_h)) + \alpha \cdot \exp(C^{-1}(\mu_n - \mu_x - \mu_h)/2)}{1+\exp(C^{-1}(\mu_n - \mu_x - \mu_h)) + \alpha \cdot \exp(C^{-1}(\mu_n - \mu_x - \mu_h)/2)}\right)C^{-1}, \quad (23)$$

where diag(.) refers to a diagonal covariance matrix with its diagonal component value being equal to the value of the vector in the argument, $\mu_n$ is an additive distortion mean vector, $\mu_h$ is a convolutive distortion mean vector, and $\mu_x$ is a clean speech mean vector. Each division of a vector can also be an element-wise operation.

Continuing with the example above, for a given additive distortion mean vector $\mu_n$ and convolutive distortion mean vector $\mu_h$, a value of G (.) can depend on the clean speech mean vector $\mu_x$. Specifically, for the k-th Gaussian in the j-th state in the compressed model 106, the adaptor component 104 can determine an element of the G (.) matrix as follows:

$$G_\alpha(j,k) = 1 - C \cdot \text{diag}\left(\frac{\exp(C^{-1}(\mu_n - \mu_{x,jk} - \mu_h)) + \alpha \cdot \exp(C^{-1}(\mu_n - \mu_{x,jk} - \mu_h)/2)}{1+\exp(C^{-1}(\mu_n - \mu_{x,jk} - \mu_h)) + 2\alpha \cdot \exp(C^{-1}(\mu_n - \mu_{x,jk} - \mu_h)/2)}\right) \cdot C^{-1} \quad (24)$$

Thereafter, the adaptor component 104 can obtain Gaussian mean vectors (the k-th Gaussian in the j-th state) of the desirably adapted compressed model 106 by taking an expectation of both sides of Equation (20):

$$\mu_{y,jk,\alpha} \approx \mu_{x,jk} + \mu_h + g_\alpha(\mu_{x,jk}, \mu_h, \mu_n), \quad (25)$$

which can be applied only to a static portion of the MFCC vector.

The adaptor component 104 can further estimate a covariance matrix $\Sigma_{y,jk,\alpha}$ in the desirably adapted compressed model 106 by determining a weighted sum of the covariance matrix of the compressed model 106 (prior to the parameters 110 therein being adapted ($\Sigma_{x,jk}$)) and the covariance matrix of distortion ($\Sigma_n$). In an example, the adaptor component 104 can determine the covariance matrix $\Sigma_{y,jk,\alpha}$ by taking a variance operation on both sides of Equation (20) as follows:

$$\Sigma_{y,jk,\alpha} = G_\alpha(j,k)\Sigma_{x,jk}G_\alpha(j,k)^T + (I-G_\alpha(j,k))\Sigma_n(I-G_\alpha(j,k))^T. \quad (26)$$

Furthermore, the adaptor component 104 may not take into consideration convolutive distortion variance as such variance can be treated as a fixed, deterministic quantity in a given utterance. The adaptor component 104 may, for delta and delta/delta portions of MFCC vectors, use the following adaption formulas for the mean vector and covariance matrix in connection with adapting the parameters of the compressed model 106:

$$\mu_{\Delta y, jk, \alpha} \approx G_\alpha(j,k)\mu_{\Delta x, jk} + (I - G_\alpha(j,k))\mu_{\Delta n}, \quad (27)$$

$$\mu_{\Delta\Delta y, jk, \alpha} \approx G_\alpha(j,k)\mu_{\Delta\Delta x, jk} + (I - G_\alpha(j,k))\mu_{\Delta\Delta n})) \quad (28)$$

$$\Sigma_{\Delta y, jk, \alpha} \approx G_\alpha(j,k)\Sigma_{\Delta\Delta x, jk} G_\alpha(j,k)^T + (I - G_\alpha(j,k))\Sigma_{\Delta\Delta n}(I - G_\alpha(j,k))^T \quad (29)$$

$$\Sigma_{\Delta\Delta y, jk, \alpha} G_\alpha(j,k)\Sigma_{\Delta\Delta x, jk} G_\alpha(j,k)^T + (I - G_\alpha(j,k))\Sigma_{\Delta\Delta n}(I - G_\alpha(j,k))^T \quad (30)$$

Thus, it can be discerned that the adaptor component 104 can adapt parameters of the compressed model 106 by considering phase corresponding to uttered speech. Furthermore, to improve performance of speech recognition using the compressed model 106, the adaptor component 104 can perform the following actions: a) adapt parameters of the compressed model 106 using initial estimates for the convolutive distortion mean vector $\mu_h$, the additive distortion mean vector $\mu_n$, and the diagonal covariance matrix diag(.); b) adapt parameters of the compressed model 106 based at least in part upon such initial estimates; c) decode the received speech utterance using the compressed model 106 with the adapted parameters; d) re-estimate parameters of the compressed model 106 based upon the received speech utterance and the adapted compressed model 106; and e) adapt parameters of the compressed model 106 based at least in part upon re-estimated parameters.

In an example, the adaptor component 104 can initialize the convolutive distortion mean vector $\mu_h$. For instance, the adaptor component 104 can initialize the convolutive distortion mean vector $\mu_h$ by setting each element of the vector to zero. Furthermore, the adaptor component 104 can initialize the additive distortion mean vector $\mu_n$ using sample estimates from at least a first plurality of frames (speech-free) from the received distorted speech utterance. In addition, the adaptor component 104 can also use sample estimates from a last plurality of frames from the received distorted speech utterance in connection with initializing the additive distortion mean vector $\mu_n$. Still further, the adaptor component 104 can initialize the diagonal covariance matrix diag(.) by using sample estimates from the first and/or last plurality of frames from the received distorted speech utterance.

As noted above, the adaptor component 104 can use the initialized convolutive distortion mean vector $\mu_h$, the additive distortion mean vector $\mu_n$, and the diagonal covariance matrix diag (.) to initially adapt parameters of the compressed model 106. The adaptor component 104 can then decode the received distorted speech utterance, and can re-estimate parameters used in the adaption algorithms noted above. In an example, the adaptor component 104 can estimate parameters pertaining to the convolution distortion mean, static and dynamic additive noise means, and static and dynamic additive noise variances. For instance, the adaptor component 104 can use an expectation-maximization algorithm in connection with re-estimating the aforementioned parameters using the first order VTS approximation.

For example, $\gamma_t(j,k)$ can denote a posterior probability for the k-th Gaussian in the j-th state of the second model 108:

$$\gamma_t(j,k) = p(\theta_t = j, \epsilon_t = k | Y, \overline{\lambda}), \quad (31)$$

where $\theta_t$ can denote the state index at time frame t, $\epsilon_t$ can denote the Gaussian index at time frame t, and $\overline{\lambda}$ can be previous parameter sets pertaining to additive and convolutive distortions. The adaptor component 104 can use the following algorithms to re-estimate the convolutive distortion mean vector $\mu_h$, the static and dynamic additive distortion mean vectors $\mu_n$, $\mu_{\Delta n}$, and $\mu_{\Delta\Delta n}$, and the static and dynamic additive distortion variances $\Sigma_n$, $\Sigma_{\Delta n}$, and $\Sigma_{\Delta\Delta n}$:

$$\mu_h = \mu_{h,0} + \left\{ \sum_t \sum_{j \in \Omega_s} \sum_{k \in \Omega_m} \Upsilon_t(j,k) \atop G_\alpha(j,k)^T \Sigma_{y,jk}^{-1} G_\alpha(j,k) \right\}^{-1} \cdot \left\{ \sum_t \sum_{j \in \Omega_s} \sum_{k \in \Omega_m} \Upsilon_t(jk) G_\alpha(jk)^T \atop \Sigma_{y,jk}^{-1} \left[ y_t - \mu_{x,jk} - \mu_{h,0} - \atop g_\alpha(\mu_{x,jk}, \mu_{h,0}, \mu_{n,0}) \right] \right\} \quad (32)$$

$$\mu_n = \mu_{n,0} + \left\{ \sum_t \sum_{j \in \Omega_s} \sum_{k \in \Omega_m} \Upsilon_t(j,k) \atop (I - G_\alpha(j,k))^T \Sigma_{y,jk,\alpha}^{-1} (I - G_\alpha(j,k)) \right\}^{-1} \cdot \left\{ \sum_t \sum_{j \in \Omega_s} \sum_{k \in \Omega_m} \Upsilon_t(jk)(1 - G_\alpha(jk))^T \atop \Sigma_{yjk\alpha}^{-1} \left[ y_t - \mu_{x,jk} - \mu_{h,0} - \atop g_\alpha(\mu_{x,jk}, \mu_{h,0}, \mu_{n,0}) \right] \right\} \quad (33)$$

$$\mu_{\Delta n} = \mu_{\Delta n,0} + \left\{ \sum_t \sum_{j \in \Omega_s} \sum_{k \in \Omega_m} \Upsilon_t(j,k) \atop (I - G_\alpha(j,k))^T \Sigma_{\Delta y,jk}^{-1} (1 - G_\alpha(j,k)) \right\}^{-1} \cdot \left\{ \sum_t \sum_{j \in \Omega_s} \sum_{k \in \Omega_m} \Upsilon_t(jk)(I - G_\alpha(jk))^T \atop \Sigma_{\Delta yjk\alpha}^{-1} [\Delta y_t - G\mu_{\Delta x,jk} - (I - G_\alpha)\mu_{\Delta n,0}] \right\} \quad (34)$$

$$\mu_{\Delta\Delta n} = \mu_{\Delta n,0} + \left\{ \sum_t \sum_{j \in \Omega_s} \sum_{k \in \Omega_m} \Upsilon_t(j,k) \atop (I - G_\alpha(j,k))^T \Sigma_{\Delta\Delta y,jk}^{-1} (I - G_\alpha(j,k)) \right\}^{-1} \cdot \left\{ \sum_t \sum_{j \in \Omega_s} \sum_{k \in \Omega_m} \Upsilon_t(jk)(I - G_\alpha(jk))^T \atop \Sigma_{\Delta\Delta y,jk}^{-1} [\Delta\Delta y_t - G\mu_{\Delta\Delta x,jk} - (I - G_\alpha)\mu_{\Delta\Delta n,0}] \right\} \quad (35)$$

$$\Sigma_n = \Sigma_{n,0} - \left( \frac{\partial^2 Q}{\partial^2 \Sigma_n} \right)^{-1}_{\Sigma_n = \Sigma_{n,0}} \left( \frac{\partial Q}{\partial \Sigma_n} \right)_{\Sigma_n = \Sigma_{n,0}} \quad (36)$$

The adaptor component 104 can estimate $\Sigma_{\Delta n}$ and $\Sigma_{\Delta\Delta n}$ in a similar manner as shown in Equation (36) by replacing static parameters with corresponding delta and delta/delta parameters. Furthermore, while the above equations consider phase, it is to be understood that phase need not be taken into consideration when using such algorithms.

Figure 3:
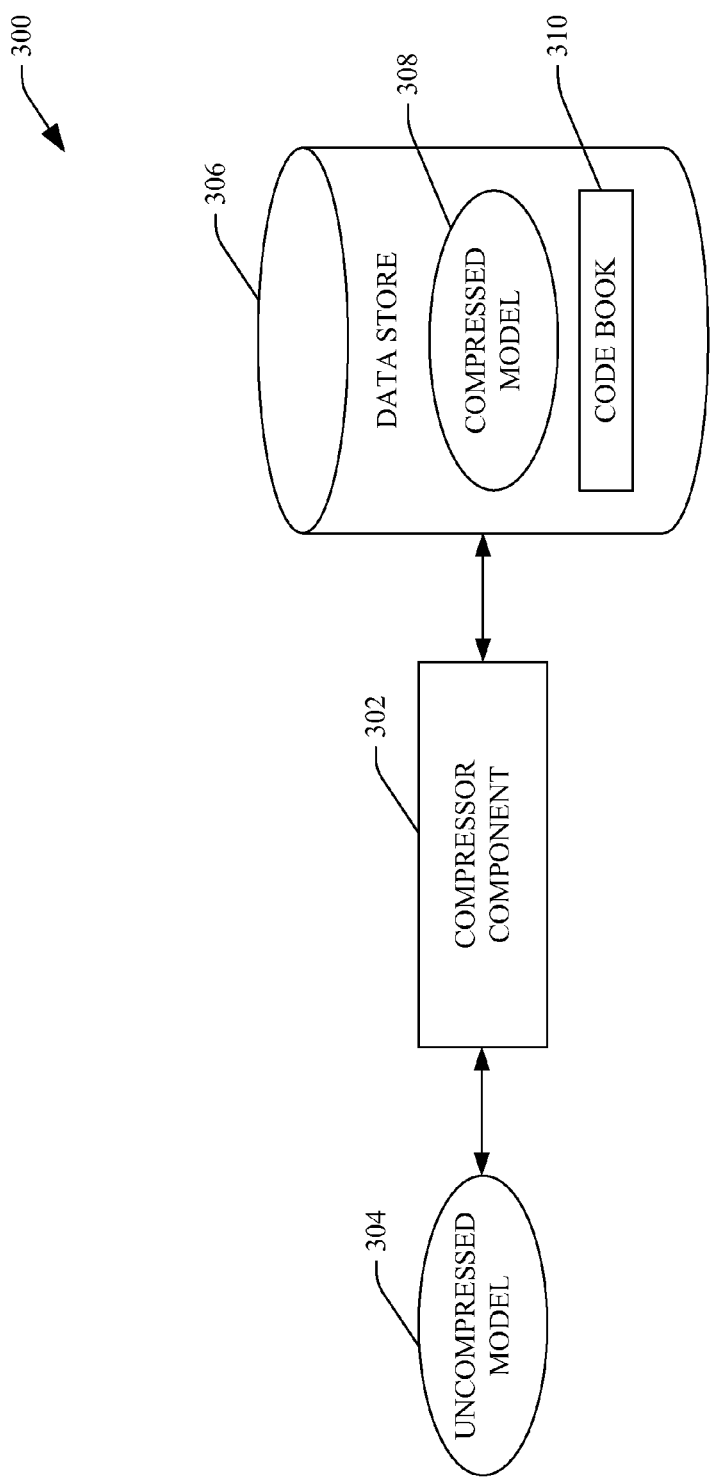
FIG. 3 is a functional block diagram of an example system that facilitates compressing a model that is configured for use in a speech recognition system.

Referring now to FIG. 3, an example system 300 that facilitates compressing a model to be used in a speech recognition system is illustrated. The system 300 includes a compressor component 302 that compresses an uncompressed model 304. The system 300 further includes a data store 306, wherein the compressor component 302 can cause a compressed model 308 to be stored in the data store 306. The compressed model 308 can be a compressed version of the uncompressed model 304. Furthermore, the compressor component 302 can create a codebook 310 when compressing the uncompressed model 304 and can cause the codebook 310 to be stored in the data store 306 (or another suitable data store). The codebook 310 can, for instance, be used by the adaptor component 104 (FIG. 1) to expand a compressed model.

Pursuant to an example, uncompressed model 304 can be a HMM that has been trained with clean speech and/or trained with "unclean" speech (e.g., speech that includes numerous distortions). Furthermore, the compressor component 302 can use any suitable compression technique to compress the uncompressed model 304 (e.g., to create the compressed model 308). In an example, the compressor component 302 can use a subspace coding (SSC) scheme. For instance, the uncompressed model 304 can include K Gaussians each with fixed dimension D and with a diagonal covariance matrix, and the compressor component 302 can perform quantization along each separate dimension of the Gaussians. Thus, the compressor component 302 can quantize dimension d of Gaussian k ($m_k[d]$, $v_k^2[d]$) into a two-dimensional vector ($\mu_n[d]$, $\sigma_n^2[d]$). The compressor component 302 can also use a standard k-means clustering algorithm to design the codebook 310 with a conventional distortion measure for Gaussian models. The centroid of a cluster can be computed by uniform quantization. It is to understood, however, that the compressor component 302 can use any suitable compression technique and/or any suitable technique to design the codebook 310 in connection with compressing the uncompressed model 304 (resulting in the compressed model 308).

Figure 4:
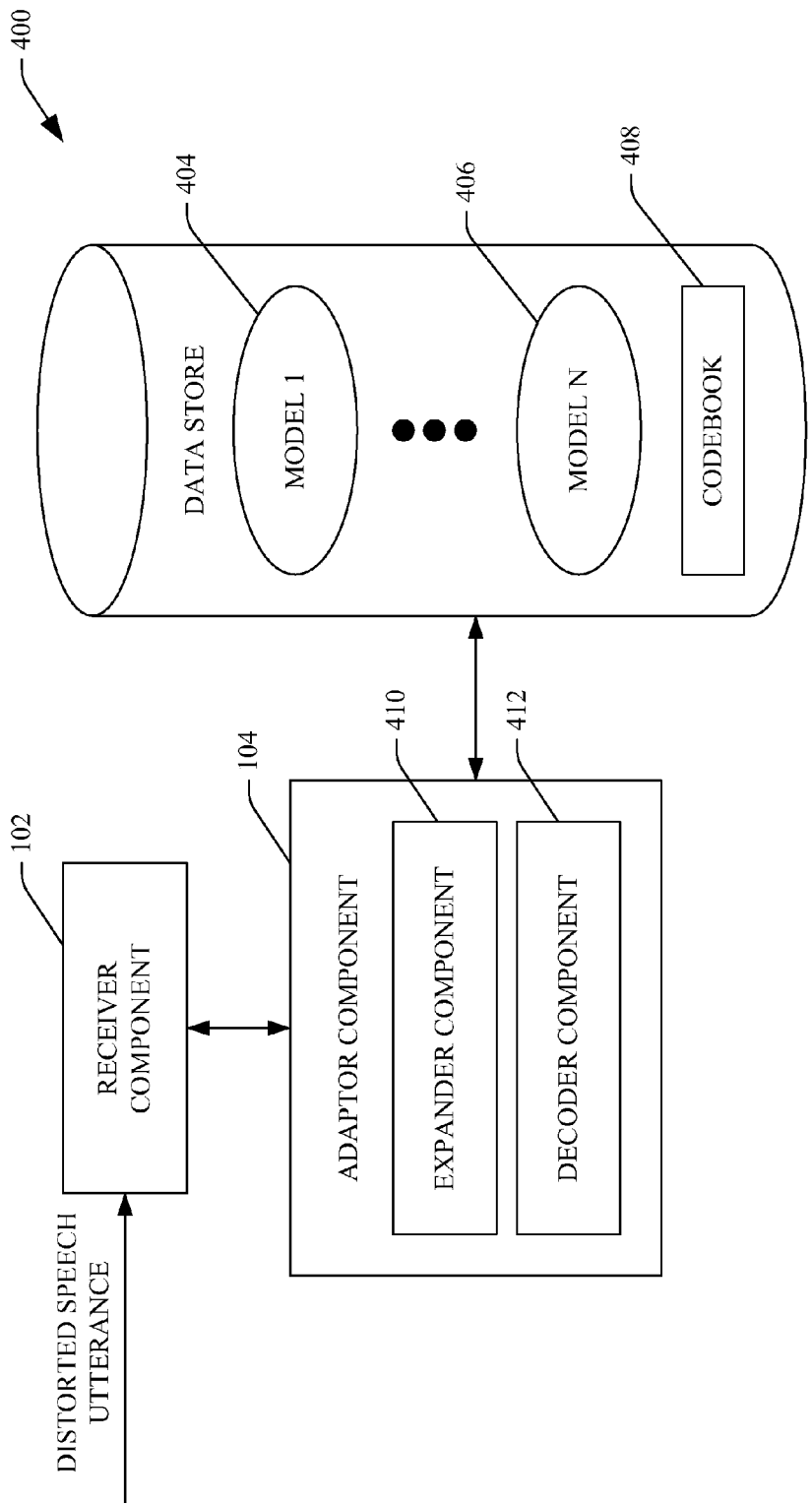
FIG. 4 is a functional block diagram of an example system that facilitates adapting parameters of a compressed model in a speech recognition system.

With reference now to FIG. 4, an example system 400 that facilitates selectively adapting compressed models in a speech recognition system is illustrated. The system 400 includes the receiver component 102 that can receive the distorted speech utterance. The adaptor component 104 can adapt a compressed model based at least in part upon the received distorted speech utterance. Pursuant to an example, the system 400 can additionally include a data store 402 which can retain multiple compressed models 404-406. For instance, the data store 402 can include a first compressed model 404 through an Nth compressed model 406, wherein different compressed models may be trained in connection with recognizing different words, sounds, syllables, etc. The data store 402 can further include a codebook 408 that can be used by the adaptor component 104 to "expand" one or more of the models when decoding the received speech utterance and/or adapting parameters of one or more of the compressed models 404-406.

The adaptor component 104 can include an expander component 410 that can use the codebook 408 to expand one or more of the compressed models 404-406 for decoding and/or adaption of parameters thereof. The adaptor component 104 can additionally include a decoder component 412 that can use one or more of the compressed models 404-406 to decode the distorted speech utterance received by the receiver component 102.

The adaptor component 104 can use various techniques to adapt parameters of one or more of the compressed models 404-406, wherein a chosen technique can be based at least in part upon available memory and/or processing resources corresponding to a speech recognition system. In a first example, the adaptor component 104 can estimate various parameters corresponding to the received distorted speech utterance. As noted above, the adaptor component 104 can use sample estimates from a first plurality of frames of the received distorted speech utterance to estimate the various parameters prior to the distorted speech utterance being decoded. The expander component 410 can access the codebook 408 and expand the compressed models 404-406, and the adaptor component 104 can adapt each of the compressed models 404-406 using the estimated parameters. The decoder component 412 can decode the received distorted speech utterance using the adapted compressed models, and the adaptor component 104 can perform re-estimation as described above (e.g., using Equations (32)-(36)). Subsequent to the decoder component 412 decoding the distorted speech utterance, the adaptor component 104 can use the parameters determined by way of Equations (32)-(36) to again adapt parameters of each of the compressed models 404-406. Re-estimation and adaption may occur iteratively if desired. The received distorted speech utterance may then be decoded using a subset of the compressed models 404-406.

In a second example, the adaptor component 104 can again estimate various parameters corresponding to the received distorted speech utterance. The expander component 410 can expand each of the compressed models 404-406 using the codebook 408 (or a plurality of codebooks). The adaptor component 104 can use such estimates to initially adapt parameters of each of the compressed models 404-406. The decoder component 412 can decode the distorted speech utterance using a subset of the compressed models 404-406 (with adapted parameters). For instance, the decoder component 412 may observe a relatively small number of the compressed models 404-406 when decoding a particular speech utterance. To reduce computational resources, the adaptor component 104 can adapt parameters of models that are observed during decoding of the received distorted speech utterance while not adapting other, unobserved compressed models. Still further, the adaptor component 104 may adapt observed Gaussians in compressed models used by the decoder component 412 when decoding the distorted speech utterance but may not adapt unobserved Gaussians. The adaptor component 104, for instance, can use the adaption algorithms (16)-(19) in connection with adapting parameters of the subset of compressed models 404-406. The decoder component 412 may then decode the distorted speech utterance using the observed, adapted compressed models 404-406. After the compressed models 404-406 have been adapted, vector quantization (VQ) can be used to compress the models (after expansion) while retaining an original mapping relation in SSC. Pursuant to an example, data-driven VQ, uniform VQ, or other vector quantization technique can be used in connection with compressing adapted models.

In a third example, the adaptor component 104 can adapt a subset of the compressed models 404-406 without adapting each model in the compressed models 404-406 using estimates described in the first two examples. For instance, the decoder component 412 can decode the speech utterance using the compressed models 404-406, wherein the compressed models 404-406 have not been subject to adaption by the adaptor component 104. A subset of the compressed models 404-406 used by the decoder component 412 to decode the distorted speech utterance can be identified, and the adaptor component 104 can adapt parameters of such subset of the compressed models 404 (e.g., using initial estimates the convolutive distortion mean vector $\mu_h$, the additive distortion mean vector $\mu_n$, and the diagonal covariance matrix diag(.)) while not adapting parameters corresponding to compressed models not observed during decoding.

Subsequent to the adaptor component 104 adapting parameters of the subset of compressed models 404-406 as described above, the decoder component 412 can use such subset of compressed models 404-406 to decode the distorted speech utterance a second time. Thereafter, the adaptor component 104 can perform re-estimation as described above (e.g., using Equations (32)-(36)), and can adapt parameters of a subset of compressed models 404-406 observed during the second decoding of the speech utterance. The decoder component 410 can then decode the distorted speech utterance a third time. As with the second example, after a subset of compressed models 404-406 that have been observed during the third decoding have been adapted, vector quantization (VQ) can be used to compress the models while retaining an original mapping relation in SSC.

With reference now to FIGS. 5-12, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 5:
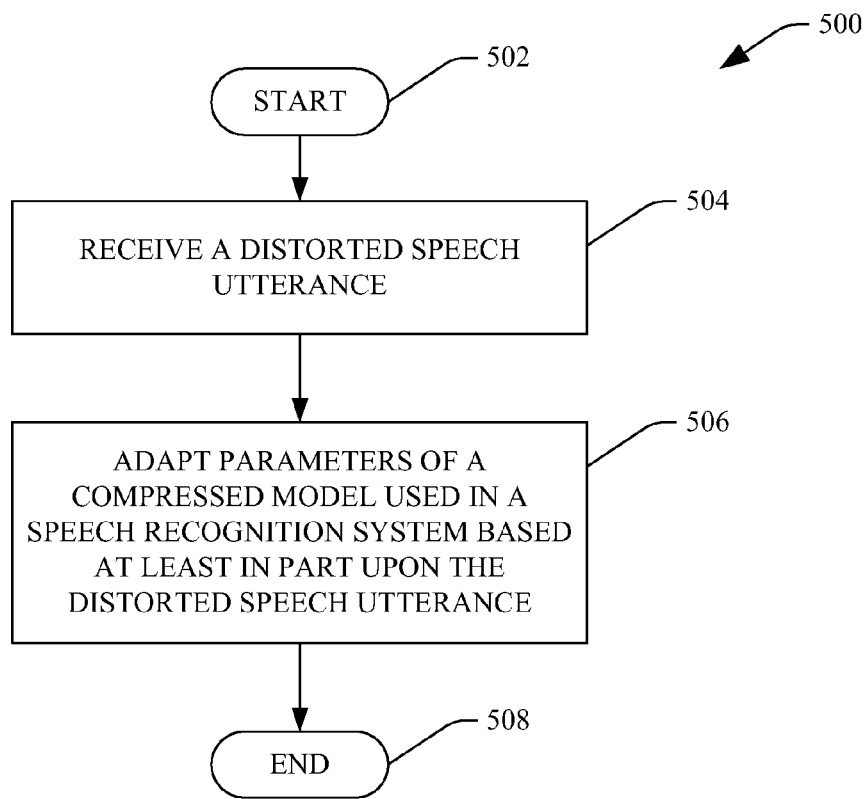
FIG. 5 is a flow diagram that illustrates an example methodology for adapting parameters of a compressed model in a speech recognition system.

Referring now to FIG. 5, an example methodology 500 that facilitates adapting a compressed model used in a speech recognition system (e.g., in a mobile apparatus) is illustrated. The methodology 500 begins at 502, and at 504 a distorted speech utterance is received (e.g., through use of one or more microphones in a mobile apparatus, such as a mobile telephone). At 506, parameters of a compressed model in the speech recognition system are adapted based at least in part upon the received distorted speech utterance. The methodology 500 completes at 508.

Figure 6:
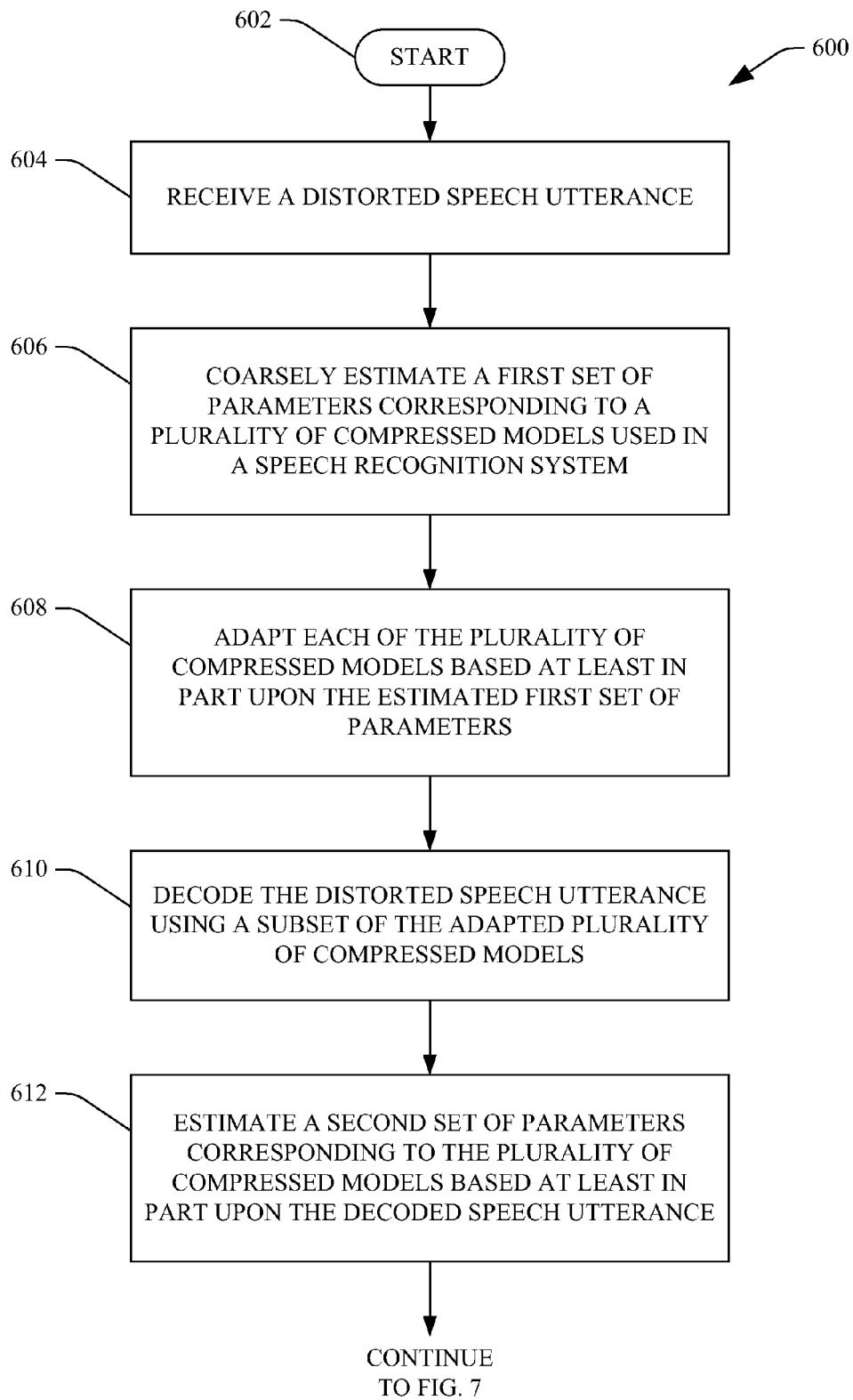
FIGS. 6 and 7 depict a flow diagram that illustrates an example methodology for adapting compressed models in a speech recognition system.

With reference now to FIG. 6, an example methodology 600 for adapting parameters of a compressed model in a speech recognition system is illustrated. The methodology 600 starts at 602, and at 604 a distorted speech utterance is received. At 606, a first set of parameters corresponding to a plurality of compressed models used in the speech recognition system can be coarsely estimated. In an example, the first set of parameters can be a convolutive distortion mean vector, an additive distortion mean vector, and/or a diagonal covariance matrix (described above). Moreover, for instance, a convolutive distortion mean vector can be initialized (e.g., such that all elements of the convolutive distortion mean vector are zero), an additive distortion mean vector can be initialized using sample estimates from a plurality of speech-free frames of the received distorted speech utterance. Similarly, a diagonal covariance matrix diag (.) can be initialized by using sample estimates from a plurality of frames (speech free) from the received distorted speech utterance.

At 608, each of the plurality of compressed models in the speech recognition system is adapted (e.g., parameters thereof are adapted) based at least in part upon the first set of parameters estimated at act 606. For example, Equations (13)-(19) can be used in connection with adapting each of the plurality of compressed models in the speech recognition system.

At 610, the distorted speech utterance received at 604 can be decoded, wherein a subset of the plurality of compressed models are observed when decoding the speech utterance. For instance, not all compressed models in a speech recognition system will be used during decoding.

At 612, a second set of parameters corresponding to the compressed models are estimated based at least in part upon the decoding act of 610. For instance, the second set of parameters can include a convolutive distortion mean vector, static and dynamic additive distortion mean vectors, and static and dynamic additive distortion variances. Furthermore, Equations (31)-(36) can be used in connection with estimating the aforementioned second set of parameters.

Figure 7:
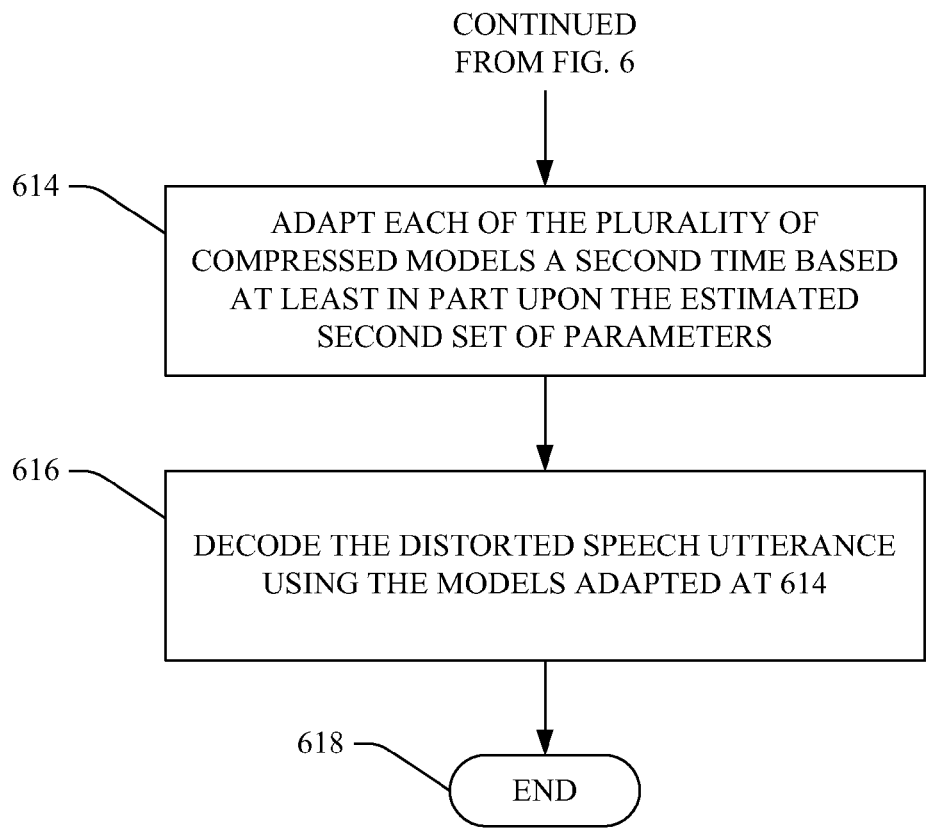

Referring now to FIG. 7, the methodology 600 continues at 614, where each of the compressed models in the speech recognition system are adapted a second time based at least in part upon the second set of parameters estimated at 612. For instance, Equations (13)-(19) can be used in connection with adapting each of the plurality of compressed models in the speech recognition system. At 616, the distorted speech utterance is decoded using the models adapted at 614. The methodology 600 completes at 618.

Figure 8:
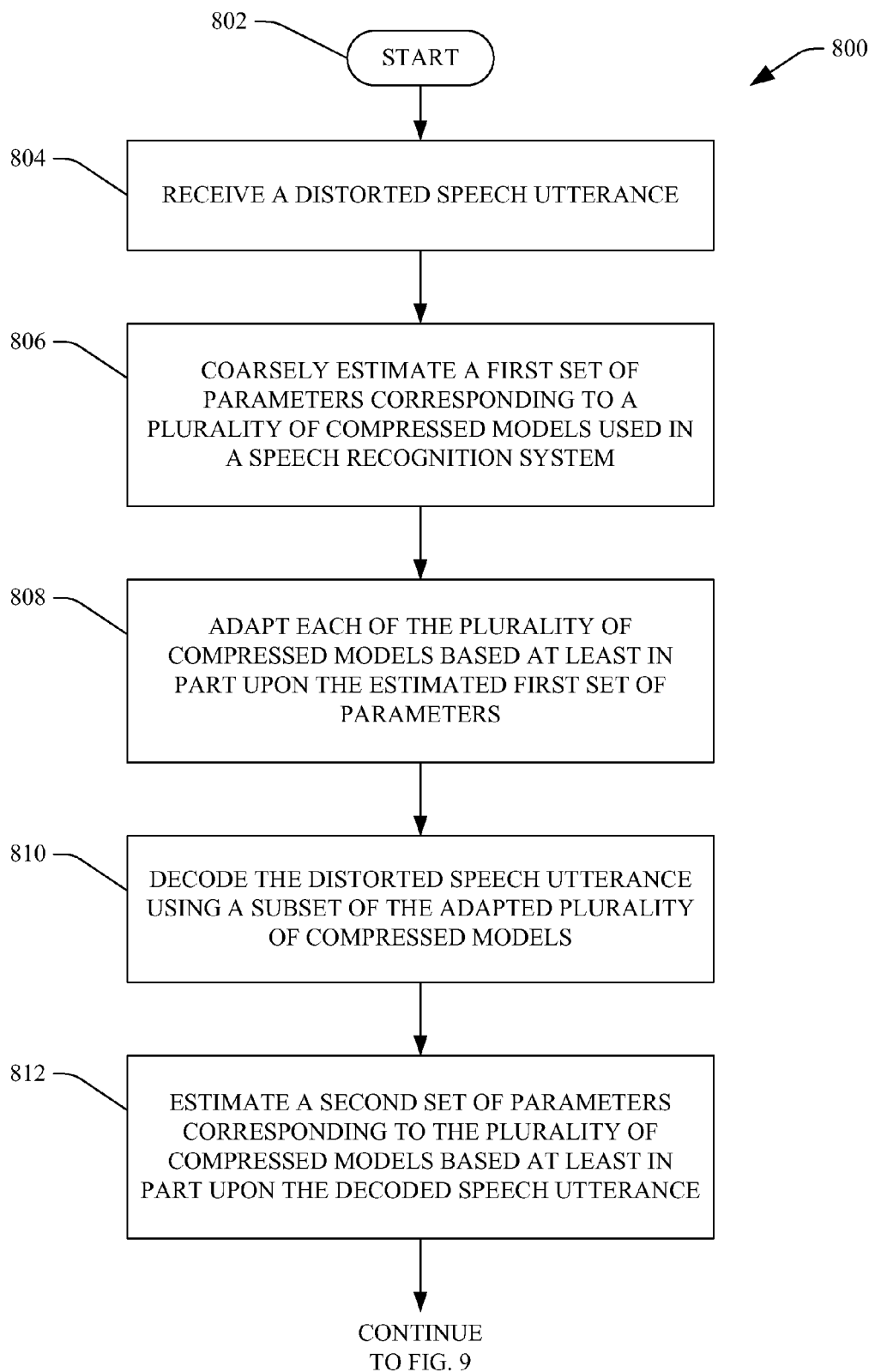
FIGS. 8 and 9 depict a flow diagram that illustrates an example methodology for selectively adapting compressed models in a speech recognition system.

Now referring to FIG. 8, an example methodology 800 for adapting parameters of compressed models in a speech recognition system is illustrated. The methodology 800 starts at 802, and at 804 a distorted speech utterance is received (e.g., through use of microphones in a mobile device). At 806, a first set of parameters corresponding to a plurality of compressed models used in the speech recognition system can be coarsely estimated. As noted above, the first set of parameters can include a convolutive distortion mean vector, an additive distortion mean vector, and/or a diagonal covariance matrix (described above).

At 808, each of the plurality of compressed models in the speech recognition system is adapted (e.g., parameters thereof are adapted) based at least in part upon the first set of parameters estimated at act 806. For example, Equations (13)-(19) can be used in connection with adapting each of the plurality of compressed models in the speech recognition system.

At 810, the distorted speech utterance received at 604 can be decoded, wherein a subset of the plurality of compressed models are observed when decoding the speech utterance. For instance, as noted above, not all compressed models in the speech recognition system will be used during decoding.

At 812, a second set of parameters corresponding to the compressed models are estimated based at least in part upon the decoding act of 810. For instance, the second set of parameters can include a convolutive distortion mean vector, static and dynamic additive distortion mean vectors, and static and dynamic additive distortion variances. Furthermore, Equations (31)-(36) can be used in connection with estimating the aforementioned second set of parameters.

Figure 9:
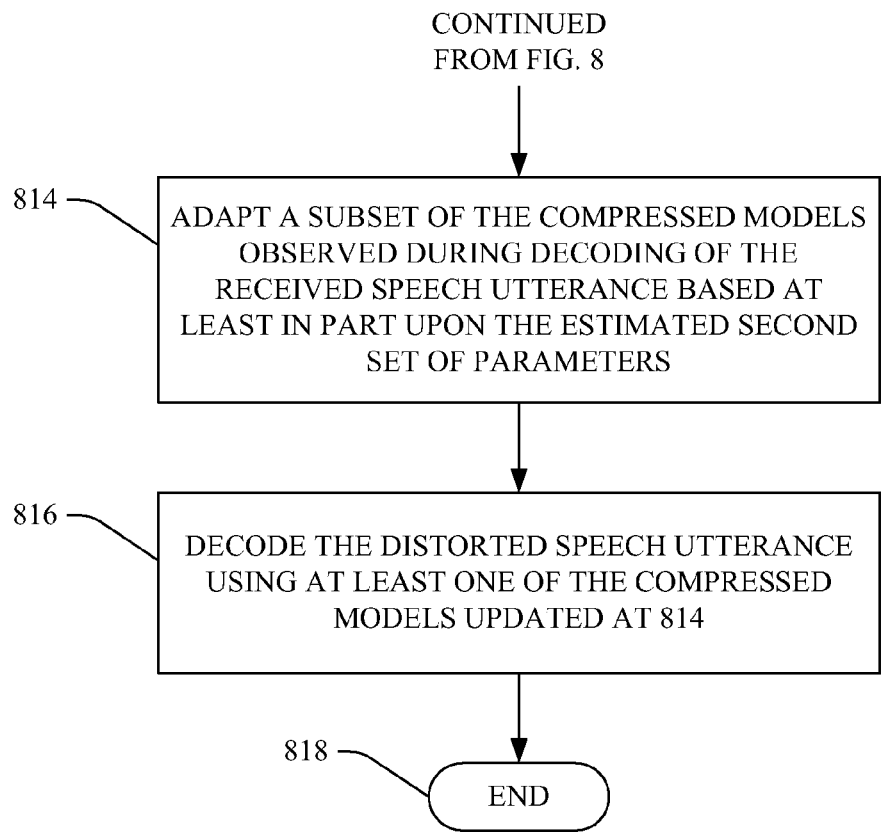

Now turning to FIG. 9, the methodology 800 continues at 814, wherein a subset of the compressed models are adapted based at least in part upon the second set of parameters estimated at 812. For instance, the subset of the compressed models may be compressed models used during the decoding act of 810 (and not other compressed models that were not used during the act of decoding). Furthermore, Equations (13)-(19) can be used in connection with adapting the subset of compressed models.

At 816, the distorted speech utterance received at 804 can be decoded using at least one of the compressed models adapted at 814. The methodology 800 ends at 818.

Figure 10:
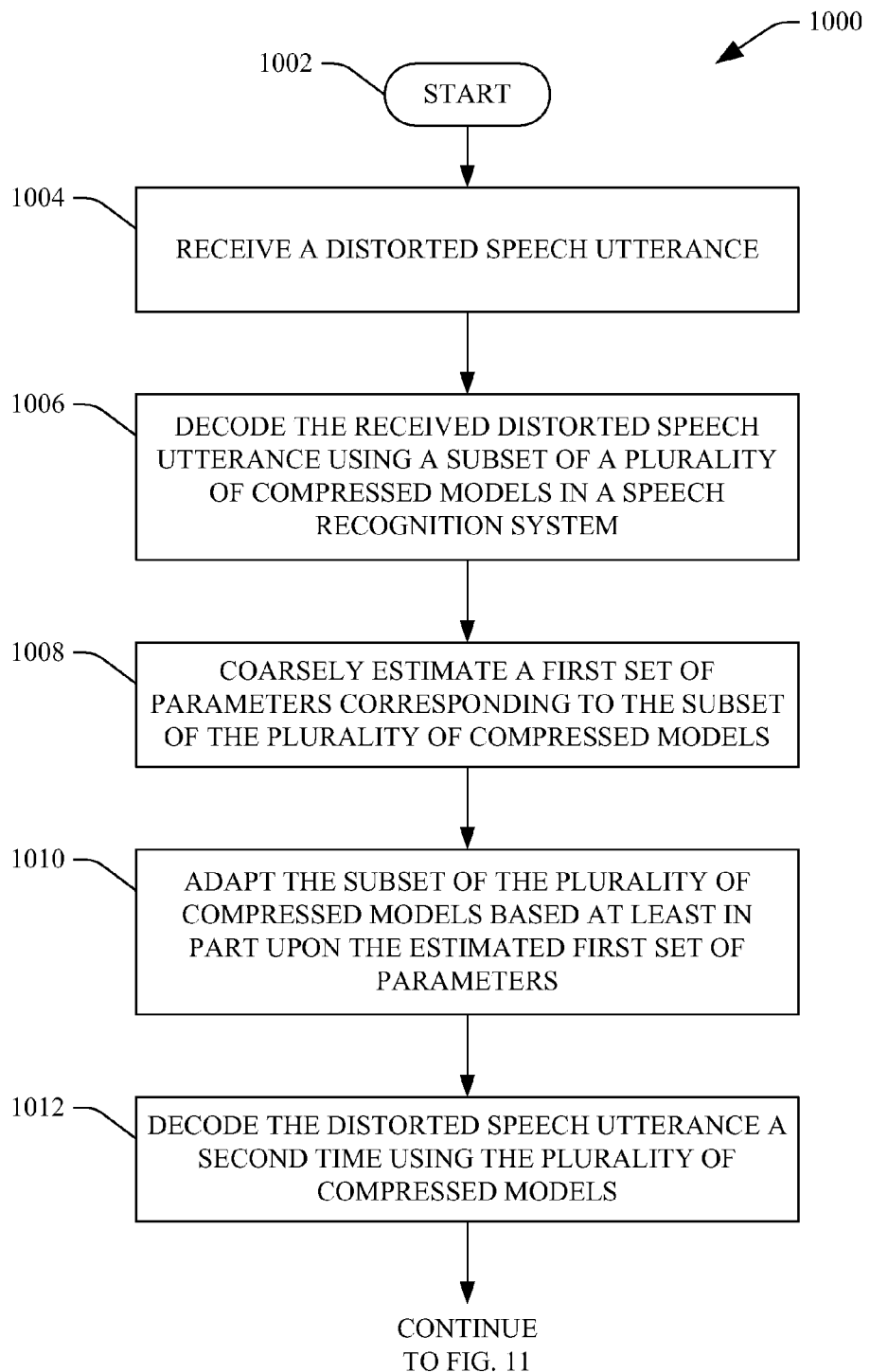
FIGS. 10 and 11 depict a flow diagram that illustrates an example methodology for selectively adapting compressed models in a speech recognition system.

Now referring to FIG. 10, an example methodology 1000 for adapting at least one compressed model used in a speech recognition system is illustrated. The methodology 1000 starts at 1002, and at 1004 a distorted speech utterance is received. At 1006, the distorted speech utterance is decoded using a first subset of a plurality of models in the speech recognition system. For instance, the speech recognition system can include a plurality of models that can be used in connection with decoding speech utterances, and for each received speech utterance a relatively small number of models may be observed during decoding.

At 1008, a first set of parameters corresponding to the first subset of the plurality of compressed models can be coarsely estimated. As noted above, the first set of parameters can include a convolutive distortion mean vector, an additive distortion mean vector, and/or a diagonal covariance matrix (described above).

At 1010, the first subset of the plurality of compressed models (e.g., compressed models observed during the decoding act of 1006) in the speech recognition system can be adapted (e.g., parameters thereof are adapted) based at least in part upon the first set of parameters estimated at act 1008. For example, Equations (13)-(19) can be used in connection with adapting the subset of compressed models in the speech recognition system.

At 1012, the received distorted speech utterance is decoded a second time using the plurality of compressed models in the speech recognition system. A second subset of the plurality of compressed models can be observed during the act of decoding, wherein the second subset may include identical models in the first subset or may include at least one different model when compared to models in the first subset of compressed models.

Figure 11:
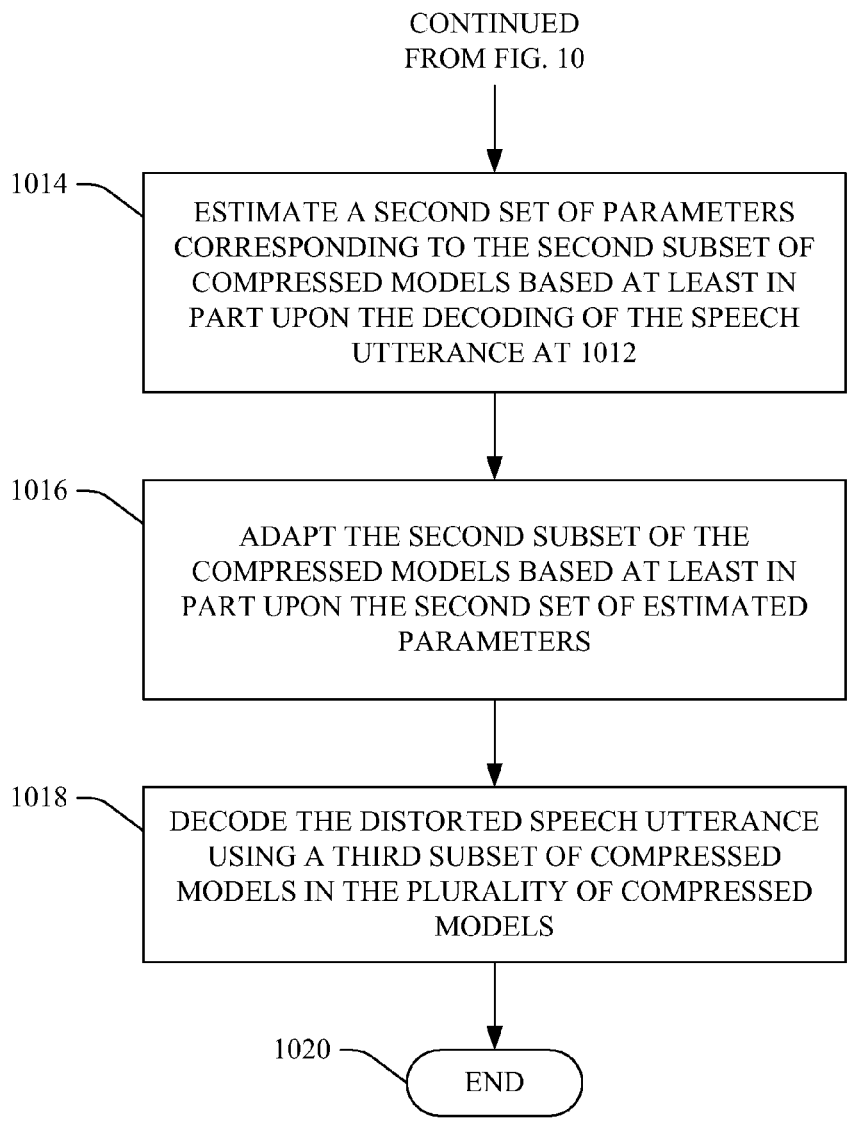

Now referring to FIG. 11, the methodology 1000 continues, and at 1014 a second set of parameters corresponding to the second subset of compressed models is estimated based at least in part upon the decoding of the speech utterance at 1012. For instance, the second set of parameters can include a convolutive distortion mean vector, static and dynamic additive distortion mean vectors, and static and dynamic additive distortion variances. Furthermore, Equations (31)-(36) or similar algorithms can be used in connection with estimating the aforementioned second set of parameters.

At 1016, the second subset of compressed models is adapted based at least in part upon the second set of parameters estimated at 1014. For instance, the second subset of compressed models can be adapted through use of Equations (13)-(19) or similar algorithms.

At 1018, the received distorted speech utterance is decoded using the plurality of compressed models, wherein a third subset of the plurality of compressed models can be observed during the act of decoding. For instance, the third subset of compressed models can be substantially similar to the first subset of compressed models and/or the second subset of compressed models. In another example, the third subset of compressed models can be non-similar to the first subset of the compressed models and/or the second subset of compressed models. The methodology 1000 completes at 1020.

Figure 12:
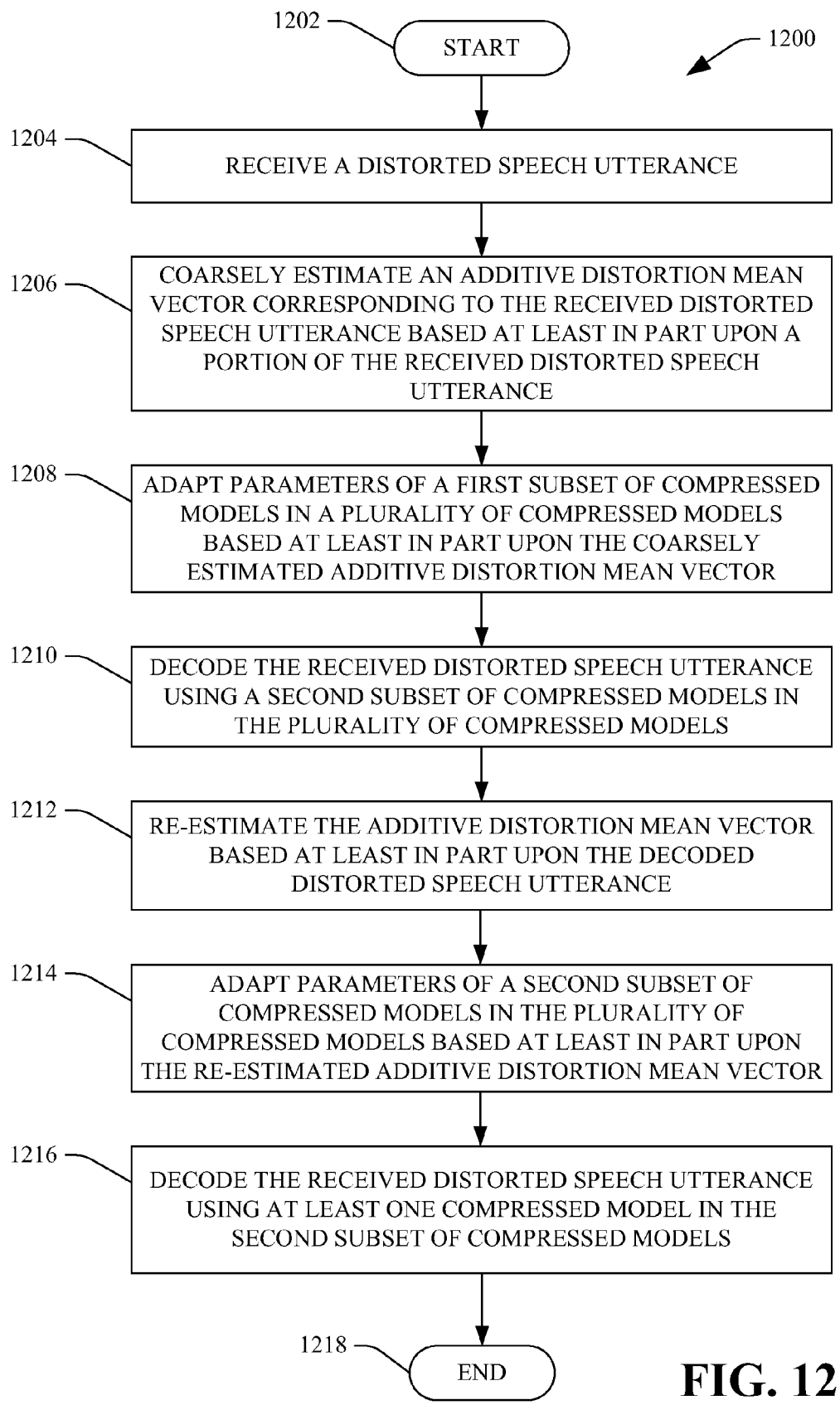
FIG. 12 is a flow diagram that illustrates an example methodology for adapting parameters of a compressed model in a speech recognition system.

Referring now to FIG. 12, an example methodology 1200 for adapting parameters in a compressed model is illustrated. For instance, the methodology 1200 can be encoded in a computer-readable medium and can be accessible by a processor. Further, the computer-readable medium can include a speech recognition system that comprises a plurality of compressed models.

The methodology 1200 starts at 1202, and at 1204 a distorted speech utterance is received. At 1206, an additive distortion mean vector corresponding to the distorted speech utterance is coarsely estimated based at least in part upon a portion of the received distorted speech utterance.

At 1208, parameters of a first subset of compressed models in the plurality of compressed models are adapted based at least in part upon the coarsely estimated additive distortion mean vector.

At 1210, the received distorted speech utterance is decoded using a second subset of compressed models in the plurality of compressed models.

At 1212, the additive distortion mean vector is re-estimated based at least in part upon the decoded speech utterance.

At 1214, parameters of the second subset of compressed models in the plurality of compressed models are adapted based at least in part upon the re-estimated additive distortion mean vector.

At 1216, the received distorted speech utterance is decoded using at least one compressed model in the second subset of compressed models. The methodology completes at 1218.

While many of the methodologies above describe adapting models, it is to be understood that the methodologies can be adapted to adapt parameters in one or more models. For instance, when a speech utterance is decoded through use of a HMM, only a portion of Gaussians in the HMM may be observed. Thus, the methodologies above can be adapted such that subsets of Gaussians in a HMM are adapted (rather than all Gaussians in the HMM). Moreover, the methodologies can be adapted such that only a portion of a model observed during decoding is adapted (e.g., to save computing and/or memory resources).

Figure 13:
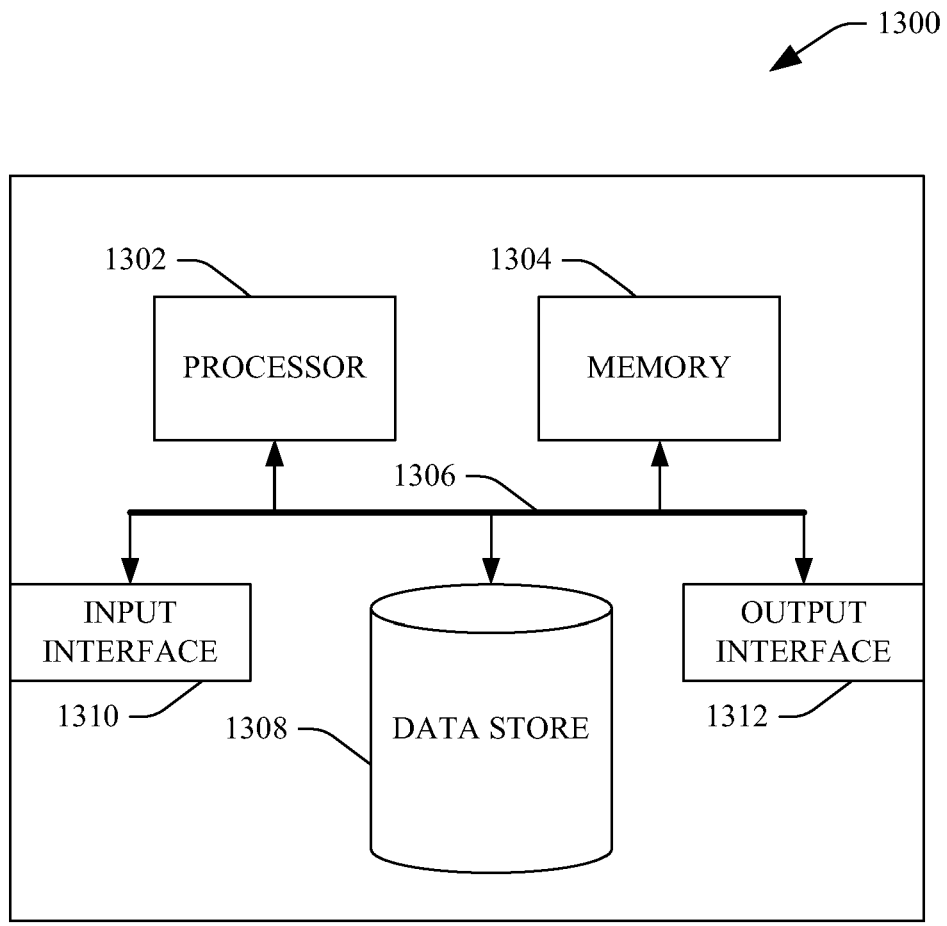
FIG. 13 is an example computing system.

Now referring to FIG. 13, a high-level illustration of an example computing device 1300 that can be used in accordance with the systems and methodologies disclosed herein is illustrated. For instance, the computing device 1300 may be used in a system that supports speech recognition. In another example, at least a portion of the computing device 1300 may be used in a system that supports speech recognition in a mobile apparatus. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store one or more compressed models (such as Hidden Markov Models), adaption algorithms, re-estimation algorithms, and the like.

The computing device 1300 additionally includes a data store 1308 that is accessible by the processor 1302 by way of the system bus 1306. The data store 1308 may include executable instructions, compressed models, etc. The computing device 1300 also includes an input interface 1310 that allows external devices to communicate with the computing device 1300. For instance, the input interface 1310 may be used to receive instructions from an external computer device, speech utterances from an individual, etc. The computing device 1300 also includes an output interface 1312 that interfaces the computing device 1300 with one or more external devices. For example, the computing device 1300 may display text, images, etc. by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A speech recognition system comprising the following computer-executable components:

a receiver component that receives a distorted speech utterance;

a plurality of compressed models usable in connection with speech recognition;

an expander component that expands the plurality of compressed models;

an adaptor component in communication with the receiver component, wherein the adaptor component coarsely estimates an additive distortion mean vector corresponding to the distorted speech utterance based at least in part upon a portion of the distorted speech utterance received by the receiver component, wherein the adaptor component selectively adapts parameters of a subset of compressed models in the plurality of compressed speech models based at least in part upon the coarsely estimated additive distortion mean vector; and a decoder component that decodes the received distorted speech utterance using a second subset of compressed models in the plurality of compressed models and outputs a decoded speech utterance, wherein subsequent to the decoder component outputting the decoded speech utterance, the adaptor component re-estimates the additive distortion mean vector based at least in part upon the decoded speech utterance, wherein subsequent to the adaptor component re-estimating the additive distortion mean vector, the adaptor component adapts parameters of the second subset of compressed models in the plurality of compressed models based at least in part upon re-estimating of the additive distortion mean vector, and wherein subsequent to the parameters of the second subset of compressed models in the plurality of compressed models being adapted, the decoder component decodes the received distorted speech utterance using at least one compressed model in the second subset of compressed models.

2. The speech recognition system of claim 1, wherein at least one compressed model in the plurality of compressed models is a compressed Hidden Markov Model.

3. The speech recognition system of claim 1, wherein the adaptor component is configured to jointly compensate for additive and convolutive distortions in the received speech utterance when adapting the parameters of the subset of the compressed models.

4. The speech recognition system of claim 1, further comprising a compressor component that receives an uncompressed model, compresses the uncompressed model, and outputs a resultant compressed model for inclusion in the plurality of compressed models.

5. The speech recognition system of claim 4, wherein the compressor component uses subspace coding to compress the uncompressed model.

6. The speech recognition system of claim 1, wherein a mobile device comprises the receiver component and the adaptor component.

7. The system of claim 6, wherein the mobile computing device is a mobile telephone.

8. The system of claim 1, wherein the adaptor component receives joint estimates of additive and convolutive distortion from a non-linear phase sensitive model of additive and convolutive distortion, and wherein the adaptor component adapts parameters of at least one compressed model in the plurality of compressed models based at least in part upon the joint estimates of additive and convolutive distortion.

9. The system of claim 8, wherein the non-linear phase-sensitive model of additive and convolutive distortions is represented as follows:

$$= x + h + C\log\left(1 + \exp(C^{-1}(n-x-h)) + 2\alpha \cdot \exp\left(\frac{C^{-1}(n-x-h)}{2}\right)\right)$$

$$= x + h + g_\alpha(x, h, n),$$

where $g_\alpha(x, h, n) = C \log(1 + \exp(C^{-1}(n-x-h) + 2\alpha \cdot \exp(C^{-1}(n-x-h)/2))$, where y, x, n, and h are vector-valued distorted speech, clean speech, additive distortion, and convolutive distortion in the received distorted speech utterance, respectively;

C is a non-square discrete cosine transform (DCT) matrix;

$C^{-1}$ is an inverse DCT matrix; and $\alpha = [\alpha^{(1)}, \alpha^{(2)}, \ldots \alpha^{(l)}, \ldots \alpha^{(L)}]^T$ is a phase-factor vector for L Mel filter banks.

10. A method comprising the following computer-executable acts:

receiving a distorted speech utterance at a mobile device that includes a speech recognition system, the speech recognition system comprising a plurality of Hidden Markov Models that have been compressed by way of subspace coding;

coarsely estimating an additive distortion mean vector based at least in part upon a plurality of frames in the distorted speech utterance that are free of human voice;

expanding each Hidden Markov Model in the plurality of Hidden Markov Models responsive to receiving the distorted speech utterance;

subsequent to expanding each Hidden Markov Model in the plurality of Hidden Markov Models, decoding the distorted speech utterance through utilization of a first subset of Hidden Markov Models in the plurality of Hidden Markov Models;

subsequent to decoding the distorted speech utterance through utilization of the first subset of Hidden Markov Models, updating parameters in each Hidden Markov Model in the first subset of Hidden Markov Models based at least in part upon the additive distortion mean vector that has been coarsely estimated;

subsequent to updating the parameters of each Hidden Markov Model in the first subset of Hidden Markov Models, decoding the distorted speech utterance through utilization of a second subset of Hidden Markov Models in the first subset of Hidden Markov Models;

re-estimating the additive distortion mean vector based at least in part upon the decoding of the distorted speech utterance through utilization of the second subset of Hidden Markov Models;

adapting parameters of each Hidden Markov Model in the second subset of Hidden Markov Models based at least in part upon the re-estimating of the additive distortion mean vector; and compressing each Hidden Markov Model in the second subset of Hidden Markov Models through vector quantization subsequent to the adapting of the parameters of each Hidden Markov Model in the second subset of Hidden Markov Models.

11. The method of claim 10, wherein the distorted speech utterance includes additive distortions and convolutive distortions.

12. The method of claim 10, further comprising:

estimating a convolutive distortion mean vector corresponding to the distorted speech utterance;

updating the parameters in each Hidden Markov Model in the first subset of Hidden Markov Models based at least in part upon the convolutive distortion mean vector;

re-estimating the convolutive distortion mean vector based at least in part upon the decoding of the distorted speech utterance through utilization of the second subset of Hidden Markov Models; and adapting parameters of each Hidden Markov Model in the second subset of Hidden Markov Models based at least in part upon the re-estimating of the additive distortion mean vector and the re-estimating of the convolutive distortion mean vector.

13. The method of claim 12, wherein a nonlinear phase-sensitive model of additive and convolutive distortion is employed to re-estimate the convolutive distortion mean vector based at least in part upon the decoding of the distorted speech utterance through utilization of the second subset of Hidden Markov Models.

14. The method of claim 13, wherein the non-linear phase-sensitive model of additive and convolutive distortions is represented as follows:

$$= x + h + C\log\left(1 + \exp(C^{-1}(n-x-h)) + 2\alpha \cdot \exp\left(\frac{C^{-1}(n-x-h)}{2}\right)\right)$$
$$= x + h + g_\alpha(x, h, n),$$

where $g_\alpha(x, h, n) = C\log(1+\exp(C^{-1}(n-x-h)+2\alpha\cdot\exp(C^{-1}(n-x-h)/2))$, where y, x, n, and h are vector-valued distorted speech, clean speech, additive distortion, and convolutive distortion in the received distorted speech utterance, respectively;

C is a non-square discrete cosine transform (DCT) matrix;

$C^{-1}$ is an inverse DCT matrix; and $\alpha=[\alpha^{(1)}, \alpha^{(2)}, \ldots \alpha^{(l)}, \ldots \alpha^{(L)}]^T$ is a phase-factor vector for L Mel filter banks.

15. The method of claim 10, wherein the mobile device is a mobile telephone.

16. A computer-readable data storage device residing in a mobile device that includes a speech recognition system comprising a plurality of compressed models, wherein the computer-readable data storage device comprises instructions that, when executed by a processor, cause the processor to perform acts comprising:

receiving a distorted speech utterance;

coarsely estimating an additive distortion mean vector corresponding to the distorted speech utterance based at least in part upon a portion of the received distorted speech utterance;

adapting parameters of a first subset of compressed models in the plurality of compressed models based at least in part upon the coarsely estimated additive distortion mean vector;

decoding the received distorted speech utterance using a second subset of compressed models in the plurality of compressed models;

re-estimating the additive distortion mean vector based at least in part upon the decoded speech utterance;

adapting parameters of the second subset of compressed models in the plurality of compressed models based at least in part upon the re-estimating of the additive distortion mean vector; and decoding the received distorted speech utterance using at least one compressed model in the second subset of compressed models.

17. The computer-readable data storage device of claim 16, wherein the mobile device is a mobile telephone.

18. The computer-readable data storage device of claim 17, wherein the speech recognition system further comprises non-linear phase-sensitive model of additive and convolutive distortions.

19. The computer-readable data storage device of claim 17, wherein the non-linear phase-sensitive model of additive and convolutive distortions is represented as follows:

$$= x + h + C\log\left(1 + \exp(C^{-1}(n-x-h)) + 2\alpha \cdot \exp\left(\frac{C^{-1}(n-x-h)}{2}\right)\right)$$
$$= x + h + g_\alpha(x, h, n),$$

where $g_\alpha(x, h, n) = C\log(1+\exp(C^{-1}(n-x-h)+2\alpha\cdot\exp(C^{-1}(n-x-h)/2))$, where y, x, n, and h are vector-valued distorted speech, clean speech, additive distortion, and convolutive distortion in the received distorted speech utterance, respectively;

C is a non-square discrete cosine transform (DCT) matrix;

$C^{-1}$ is an inverse DCT matrix; and $\alpha=[\alpha^{(1)}, \alpha^{(2)}, \ldots \alpha^{(l)}, \ldots \alpha^{(L)}]^T$ is a phase-factor vector for L Mel filter banks.

20. The computer-readable data storage device of claim 17, wherein the acts further comprise:

recognizing at least one word in the distorted speech utterance; and performing a computing task responsive to recognizing the at least one word in the distorted speech utterance.

* * * * *